March 24, 1970  W. F. DELP  3,502,893
RADIATION SENSITIVE MEANS FOR DETERMINING THE POSITION
OF AN OBJECT
Filed Oct. 27, 1967  4 Sheets-Sheet 3

INVENTOR
WINNER F. DELP
BY Seidel & Gonda
ATTORNEYS.

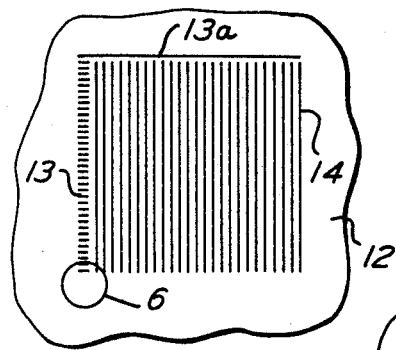
FIG. 5
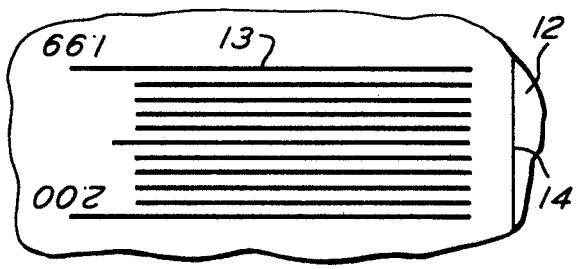
FIG. 6
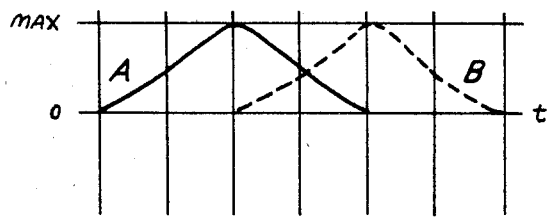
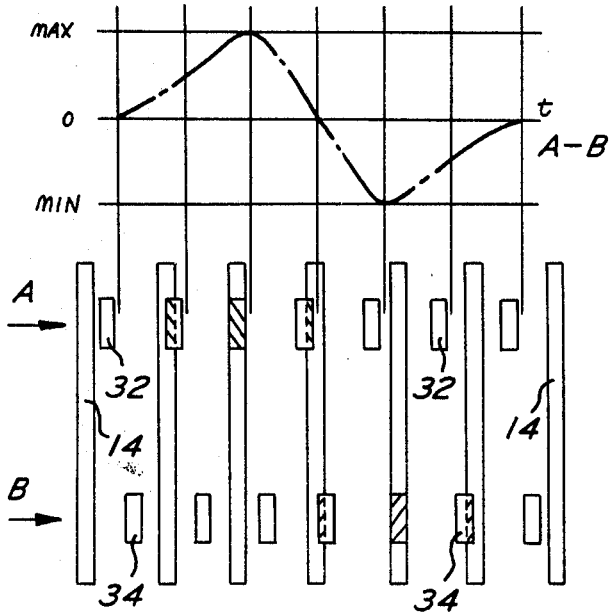
FIG. 7
INVENTOR
WINNER F. DELP
BY Seidel & Gonda
ATTORNEYS.

United States Patent Office 3,502,893
Patented Mar. 24, 1970

3,502,893
RADIATION SENSITIVE MEANS FOR DETERMINING THE POSITION OF AN OBJECT
Winner F. Delp, Fort Washington, Pa., assignor to The Jade Corporation, Bethayres, Pa., a corporation of Pennsylvania
Continuation-in-part of application Ser. No. 560,520, June 27, 1966. This application Oct. 27, 1967, Ser. No. 678,694
Int. Cl. G01d 5/34
U.S. Cl. 250—231         4 Claims

ABSTRACT OF THE DISCLOSURE

Electro-optical position sensing apparatus for repetitively determining the position of a moving object on coordinate axes by photoelectrically sensing the passage of reflective lines and counting the number of such lines until a predetermined position is reached on each axis. The apparatus includes electronic circuitry for compensating for the play in mechanical drive apparatus. Circuit can be used to trigger additional machine functions when a preset position is reached.

---

This is a continuation-in-part of patent application Ser. No. 560,520 filed June 27, 1966, now U.S. Patent 3,423,597 for Position Sensing Apparatus and is related to Ser. No. 455,857 filed May 14, 1965, now U.S. Patent 3,399,593 for Precision Artwork Duplicating Machine.

This invention relates to a position sensing apparatus. More particularly, this invention relates to a position sensing apparatus for accurately and automatically controlling the function of a machine or the like in response to the position of the object being sensed. The machine is accurate with ±5 micro-inches and capable of continuously repeating within this margin of error. The object being sensed may or may not be the article which the responsive machine is intended to operate on.

In many manufacturing processes it is desirable to perform repetitive operations. The timing and accuracy of these operations often depends upon the position of the article being operated upon or the position of a functionally related object. The timing and positioning of the object must, in many instances, be extremely precise, such as when manufacturing mircocircuits.

The manufacture of microcircuits often requires the repetitive exposure of images focused on the surface of a substrate coated with a photo-resist material. The light for creating the image is generated by a flash-lamp and focused by an optical system. Examples of this type of system may be found in copending application Ser. No. 455,857 filed May 14, 1965 entitled Precision Artwork Duplicating Machine. The foregoing machine requires that a flash-lamp or some other high intensity source of electromagnetic radiation be repetitively triggered when a masterplate has been accurately positioned.

The present invention is an improvement on the above-identified U.S. patent application Ser. No. 455,587 for Precision Artwork Duplicating Machine. In that specification, there is disclosed extremely accurate apparatus for coaxially aligning a reduction printer, the image to be reduced by the printer, a negative or some other form of sensitized material, and a guide pattern. The guide pattern controls the position of the sensitized material with respect to the image mounted on the reduction printer. Thus, the sensitized material moves with the guide pattern which is observed through a high powered microscope having a reticle thereon. The guide pattern may be a plate upon which are etched a plurality of coordinate lines.

One of the major advantages of the device disclosed in the aforesaid application which partly accounts for its extreme accuracy is that it reduces any error in the machine to a controllable first order. Positioning depends only upon the alignment of the reticle with the guide plate and the guide plate is accurately made to position itself coaxially on the optical axis of the reduction printer. Hence, any error in the machine is directly attributable to error which is built into the guide plate. Since this error is only of the first order and repeats at a constant rate, it is controllable.

Other machines which attempt to align the reduction printer and sensitized plate by measuring the displacement of the movable table upon which the plate is mounted cannot possibly be so accurate since they have inaccuracies reaching the third, fourth or even fifth order. The means by which the alignment is gauged in such machines is usually removed from the aforesaid axis thereby introducing a second order of error above the error in the gauging means. Moreover, changes such as expansion and contraction of moving parts as well as mechanical play must be taken into account. As the number of errors multiply, it becomes increasingly difficult if not impossible to compensate for them. Such machines may be able to repeat the manufacture of a particular device for one, two or even six months. However, tests have shown that they eventually come out of alignment and are incapable of taking the necessary repetitious steps. On the other hand, applicant's device as disclosed in the aforesaid application is capable of continuously making the same repetitive reduced image on the sensitized sheet without loss of accuracy.

The present invention is an improvement upon the basic device disclosed in copending application Ser. No. 455,857. This invention provides sensing means and an electronic circuit responsive to that sensing means for detecting lines on a guide plate and automatically and extremely accurately positioning the guide plate on the optical axis of the reduction printer. Once the guide plate has been accurately positioned or as it passes the sensed position, the electronic circuit initiates a machine function such as the initiation of a high intensity flash-lamp to record the image held by the reduction printer on the sensitized plate.

The present invention is described in connection with the triggering of a source of electromagnetic energy in the form of light. However, those skilled in the art will readily recognize that the invention has general application for controlling many types of machine functions and therefore is not limited to the mode described.

For the purpose of illustrating the invention there is shown in the drawings a form which is presently preferred; it being understood, however, that this invention is not limited to the precise arrangements and instrumentalities shown.

FIGURE 5 is an illustration of the scale on the object being detected.

FIGURE 6 is an enlarged view of a portion of the scale illustrated in FIGURE 5.

FIGURE 7 is a graphical illustration of the output of certain photosensitive devices in response to the position of the object being sensed.

Figure 3:
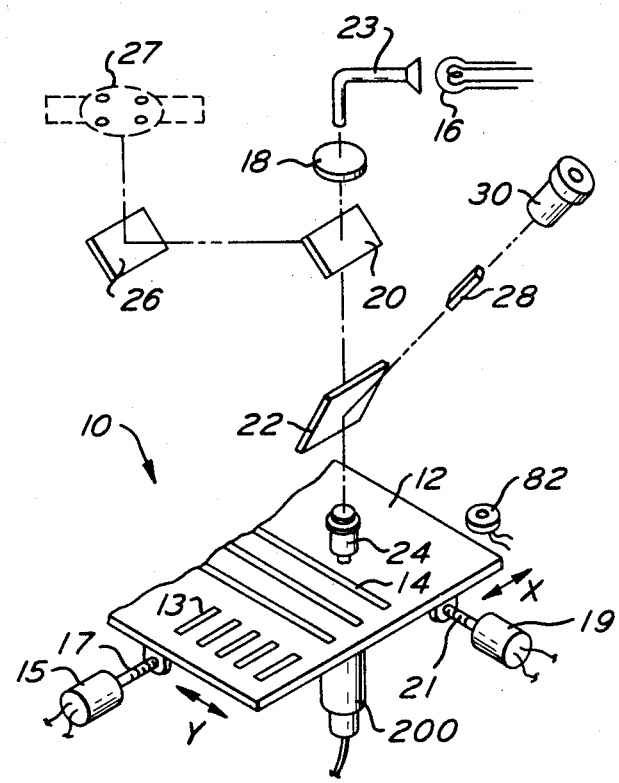
FIGURE 3 is an exploded view of an optical detecting system and movable guide pattern for the present invention.

Referring now to the drawings in detail, wherein like numerals indicate like elements, there is shown in FIGURE 3 an exploded view of an optical system and movable guide pattern designated generally as 10. The optical system described herein is merely illustrative since there are several types of systems that may be used. The optical system and guide pattern are illustrated schematically in FIGURE 3 since the same apparatus is fully disclosed in copending application Ser. No. 455,857. The same apparatus is used for the present invention except where modifications are noted. Reference is made to that application where knowledge of details of structure is desired.

The optical system 10 is located adjacent a reciprocable guide pattern 12 on which have been imprinted a plurality of contrasting lines 13 and 14. For reasons that are apparent below, the lines 13 and 14 are formed on the surface of pattern 12 as accurately as possible. Such accuracy includes both line spacing and line weight. The lines 13 and 14 are illustrated in rectangular form for convenience in explaining the invention, but in practice the lines have a thickness of .0003 to .0005 inch. The line thickness may vary, but variations of ±10% have little or no effect on the accuracy because the sensor is constructed to detect only the center of the lines 13 and 14.

The lines 13 and 14 are shown in greater detail in FIGURES 5 and 6. FIGURE 5 is an example of the graduated portion of an object 12. In this particular example, the pattern 12 is four inches by five inches with the line graduations centrally located. The lines 14 may be used to measure the X axis displacement of the object 12 over an area of two inches and are spaced apart .001 inch. Thus, there are 2001 lines 14 centered on the object 12. The horizontal lines which may be used to detect movement along what will be referred to as the Y axis over a length of two inches. Accordingly, there are 2001 lines 13 centered on the object 12. Lines 13 are also .0003 inch thick with a tolerance of ±10%. An alignment guide line 13a is also provided. It is the same as lines 13 but extends fully across one end of lines 14.

FIGURE 6 shows an enlarged view of a portion of FIGURE 5. As shown, every fifth line 13 is somewhat longer than the intermediate four lines. Moreover, every tenth line is even longer. This is merely a conventional means for allowing optical viewing of the lines and indicating position. The Y axis lines 13 can be viewed through an optical system and the numbering from 2.00 to .00 at every .010 increment starting from one end of the object can be read. The numbers should be approximately .003 inch in height by .007 inch in length.

All lines 13, 14 may be made using a highly reflective chrome or equivalent reflective metal deposited on the plate which with lines 13 and 14 makes up pattern 12. Pattern 12 may be clear glass or black glass, as desired. Any type of material is adequate so long as the reflectivity of the lines 13 and 14 permits them to distinguish from the background. It is also possible to invert the process using a reflective surface with contrasting lines.

The reciprocable pattern 12 represents the article whose position is being sensed. The pattern 12 may be connected to a reciprocable support table for a substrate on which has been placed a sensitized material such as a photoresist. The pattern 12 has previously been prepared with the lines 13 and 14 to indicate displacement relative to an initial position, and as is explained below, to trigger a machine function as it arrives in the correct position. In the embodiment shown, reciprocation takes place along coordinate X and Y axes with the primary machine triggering function to be initiated during reciprocation along the X axis. The X axis drive is illustrated by a motor 15 which rotates a screw 17 that is threadedly connected to a support for pattern 12. The Y axis drive is illustrated by a motor 19 which rotates a screw 21 that is threadedly engaged in a support for pattern 12. Details of this structure are shown in copending application Ser. No. 455,857 with the exception that motors 15 and 19 are added ahead of the handwheels.

The object 12 is illuminated by a light source 16 whose electromagnetic energy passes through the light conducting rod 23, the condenser lens 18, the partially reflecting mirror 20, the partially reflecting mirror 22, and the objective lens 24 onto the surface of pattern 12. Although the present embodiment uses the light from source 16 as being directed onto and reflected from the pattern 12, it is within the scope of this invention to pass the light from a similar source directly through the pattern 12 and into the objective lens 24. Light conducting rod 23 permits the hot source 16 to be remotely mounted to avoid the affect of its heat. Light from the source 16 is reflected from the pattern 12 by lines 13 or lines 14 back through the objective lens 24, through the partially reflecting mirror 22, and then is reflected by the partially reflecting mirror 20 to the full reflecting mirror 26. Mirror 26 directs the reflected light onto a photocell unit indicated generally as 27.

Photocell unit 27 supports all of the photocells to be used in the present invention in the focal plane of the objective lens 24. Objective lens 24 may be anywhere from a twenty to a forty power objective with a focal length of sufficient size to form an image of one of the lines 13, 14 on the photocell unit 27. Partially reflecting mirror 22 directs some of the light reflected from object 12 through an image correcting prism 28 into the eyepiece 30. The eyepiece 30 permits visual focusing of the object 12 by relating the eyepiece focal plane and the objective lens focal plane. Thus, when one is in focus the other is also in focus. Moreover, the eyepiece 30 permits the machine operator to manually adjust the position of pattern 12 if desired.

Figure 4:
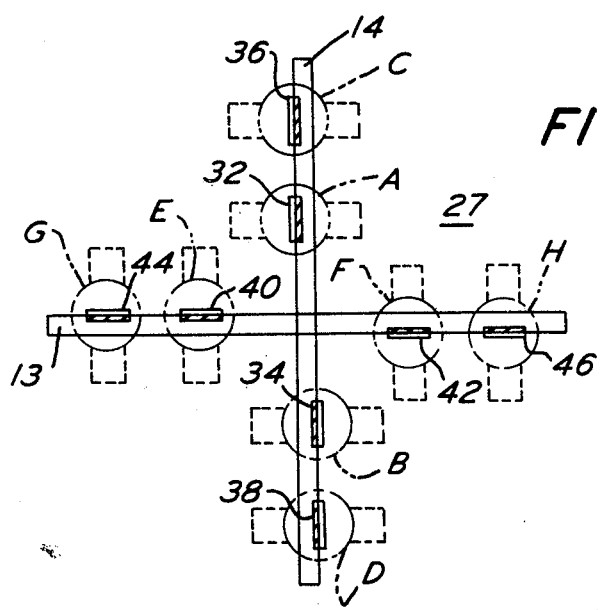
FIGURE 4 is an enlarged view illustrating the presentation of magnified images of lines on photocell apertures.

FIGURE 4 shows the photocell unit 27 at the focal plane of the objective lens 24. As shown, the surface of unit 27 at the aforesaid focal plane includes eight rectangular apertures which are paired to cooperate as explained below. The paired apertures are 32–34, 36–38, 40–42, and 44–46. The apertures 32–46 are formed so as to be equal in width to the magnified images of lines 13 and 14. Thus, in the example disclosed, they would have a width of .0003 inch multiplied by the number of times the line is magnified by objective lens 24. The length of the apertures 32–46 is not particularly significant execpt they must be shorter than the magnified image of lines 13, 14 and of sufficient length to allow enough light to pass therethrough to activate the photocells. Each aperture 32–46 is spaced apart from its mated aperture by a distance which is somewhat less than the length of the image of the lines 13, 14. For purposes of better illustrating the invention, an image of both lines 13 and 14 has been drawn in FIGURE 4, although the lines will not be presented simultaneously to the objective lens using the disclosed embodiment of pattern 12.

Each aperture within a particular set is positioned so that its side edges are parallel with its mated pair. For example, the side edges of aperture 32 are parallel to the side edges of aperture 34. The same positioning is true of each of the other mated pairs. The inner side edges of each mated pair of apertures are not necessarily aligned with each other. However, if they are not so aligned, then the space between each of the inner side edges and the center line of the optical image of the line must be equal. Photocells A, B, C, D, E, F, G, and H, respectively, are mounted in overlying relation to the apertures 32–46. The photocells A–H completely overlie their respective apertures 32–46. Accordingly, the photocells will sense the presence of the magnified line images 13, 14 during the time any one of them is focused on the apertures 32–46.

FIGURE 7 is a graphical illustration of the response of photocells A and B to the presence of the magnified line image when it passes over apertures 32–34. Similar graphs could be drawn for all of the remaining noted pairs of apertures and photocells but they would be identical. Accordingly, only one graphical analysis is necessary to illustrate this particular function of the invention.

The lowermost portion of FIGURE 7 shows a sequential approach from left to right of the magnified line image 14 toward and past the apertures 32 and 34. The uppermost graph in FIGURE 7 represents the output of photocells A and B as a function of time. In this case time is a direct function of the physical relation of line 14 to apertures 32 and 34. The output values of the photocells A and B are taken along the abscissa or time axis of the graph at points corresponding to the position of the magnified line image 14 in relation to the apertures 32 and 34. For example, reading left to right, the first position shows line image 14 just before it passes over aperture 32, while the third sequential position of line image 14 shows it completely overlying aperture 32. Accordingly, the output of photocell A is represented in the uppermost graph as rising from zero to a maximum. In the fourth position from the left, the line image 14 is shown overlying both the apertures 32 and 34 by an equal amount. Accordingly, the output of photocells A and B is represented as being equal and between zero and the maximum. The middle graph in FIGURE 7 represents the result when the output of photocell B is electronically subtracted from the output of photocell A.

From the foregoing, it should be obvious that photocells C–D, E–F, and G–H will have similar outputs when a line image is presented to the respective apertures. It should also be obvious from the foregoing description that the output of photocells C–D and G–H duplicates that of photocells A–B and E–F, respectively. These former mentioned photocells are redundant in function to the latter to assure that the system does not fail because of a break in the lines 13 or 14. Thus, if a break in the lines 13 or 14 causes the first set of photocells to miss the line or to insufficiently respond then the second set will pick it up. The duplicating or redundance photocells are preferably connected to the same circuit as the basic photocells through an electronic gate which opens when one of the pairs reaches a preset level. A diode gate such as diode OR gate circuit would perform this function.

Figure 1:
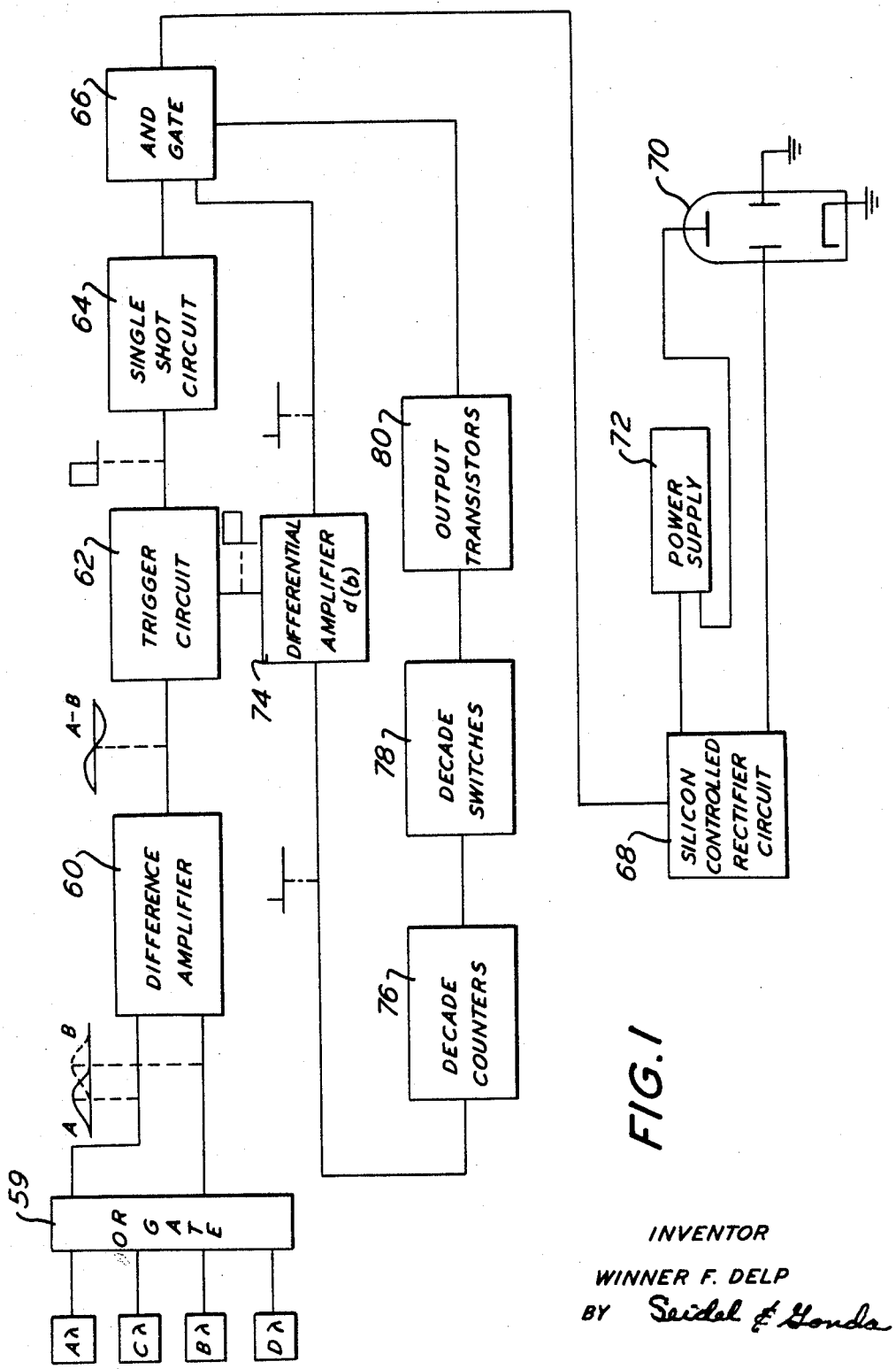
FIGURE 1 is a schematic diagram illustrating in block form a portion of the electronic circuit for this invention.

Referring now to FIGURE 1, there is shown a schematic block diagram of the electronic circuitry incorporated in the present invention for detecting displacement of the object 12 along the X axis and triggering a light source in the form of a photoflash when the predetermined position is reached. The circuitry is shown in block form since each of the elements making it up is known to those skilled in the art.

As shown in FIGURE 1, photocells A and C as well as photocells B and D are connected to the difference amplifier 60 through OR gate 59. All photocells are preferably of the photomultiplier type. Appropriate and well known voltage biasing circuits for the photocells are provided.

For purposes of better illustrating the invention, a small graph representative of the output of certain sections of the circuitry is shown between blocks. Thus, between the gate 59 and the difference amplifier 60, there is shown a graph of the output of each photocell A and B, it being assumed that they triggered the gate.

Difference amplifier 60 is of a well known type whose output is the difference between the output of photocell A and photocell B. This output is illustrated in the middle graph of FIGURE 7. It is also illustrated above the line connecting the difference amplifier 60 with the triggered circuit 62. Trigger circuit 62 may be any one of a well known type such as the asymmetrical trigger sometimes called a Schmitt circuit. The advantage of a Schmitt trigger is that one control will accept two kinds (positive and negative) of input signals causing the circuit to flip in one direction and then flop back. The trigger circuit 62 is adjusted to flip as the difference signal $A-B$ reaches a predetermined positive level and to remain in that condition until the difference signal $A-B$ reaches a predetermined negative level or zero. Trigger circuit 62 is connected to a single shot circuit 64 which in turn is connected to an AND gate 66 which may be of the diode type. AND gate 66 is connected to the silicon controlled rectifier 68 which in turn is connected to a flash lamp 70 which may be of the xenon type. A power supply 72 supplies power to the xenon lamp 70 through the silicon controlled rectifier circuit 68 which performs a switching function in response to signals received from the AND gate 66.

Trigger circuit 62 is also connected to a differential amplifier 74 which in turn is also connected to the AND gate 66. The AND gate 66 controls the application of the output of differential amplifier 74 to the silicon controlled rectifier circuit 68. As explained below, this output can be applied to the silicon controlled rectifier 68 only when certain conditions are satisified to turn the AND gate 68 on. These conditions are the operation of the single shot circuit 64 and the satisfaction of a predetermined count as indicated by a signal from a count circuit to be described below.

For purposes of this portion of the description, it will be assumed that the count circuit has been satisfied and that that much of the AND gate input is correctly biased. Trigger circuit 62 includes appropriate circuit components for flipping it to a condition where its output terminal has a positive voltage when the diffeernce signal from difference amplifier 60 reaches a predetermined positive value. The circuit components of trigger circuit 62 also maintain this positive value until the difference signal $A-B$ passes through zero. As explained above, this is an indication that one of the lines 14 is precisely positioned over the apertures for photocells A and B. At this point, the output voltage level of the trigger circuit 62 drops to zero. This output is graphically illustrated in FIGURE 1 between the trigger circuit 62 and single shot circuit 64 as well as between the trigger circuit 62 and differential amplifier 74.

The effect of the voltage level applied from trigger circuit 62 to single shot circuit 64 is to bias the single shot circuit to an on condition wherein it applies its voltage output to the AND gate for a predetermined amount of time. This amount of time is adjusted to extend from the time the trigger circuit 62 biases the single shot circuit 64 to its on condition until the difference signal $A-B$ from difference amplifier 60 is well negative. The timing of the single shot circuit is of course independent of the trigger circuit once it is biased to an on condition. Thus, the AND gate 66 remains open during a substantial portion of the time in which an image of one of the lines 14 is focused on the photocells.

Differential amplifier 74 differentiates the signal from trigger circuit 62 thereby creating a positive spike as it flips to its first condition and a negative spike as it flops to its original condition. The positive spike is created at the same time the single shot circuit 64 is operated and therefore has no effect on the remainder of the circuit. The negative spike occurs while the single shot circuit 64 is holding the AND gates 66 open. Accordingly, the negative spike from differential amplifier 74 passes through the AND gate 66 and is applied to the silicon controlled rectifier circuit 68 to thereby switch it to an on condition and permit power from power supply 72 to be applied to the xenon 70.

Since the negative spike from differential amplifier 74 occurs each time the difference signal from diffeernce amplifier 60 passes through zero, and this is physically representative of the precise positioning of the line 14 over the photocells A and B, an extremely accurate triggering circuit for the xenon 70 has been provided. One reason for the extreme accuracy aside from the fact that it is being electronically rather than visually measured is that the photocells do not rely upon the detection of the line 14 per se, but upon its leading and trailing edges which makes for a much more accurate position triggering mechanism.

The advantage of gating the negative spike from differential amplifier 74 to the silicon controlled rectifier circuit 68 is that it greatly reduces the chances of a stray negative spike firing the silicon controlled rectifier circuit 68. Thus, the gate 66 is biased to its open condition only for a short period of time which measures in milliseconds. At all other times, it isolates the silicon controlled rectifier circuit from the remainder of the circuit.

The output from differential amplifier 74 is also applied to decade counters 76 which respond to negative spikes only. The output from decade counters 76 is conducted to decade switches 78 which may be preset to a desired line count. Decade switches 78 are of the type which present a zero voltage level when the count is satisfied. Otherwise, they maintain a voltage on the output transistors 80. Output transistors 80 are connected to the second input terminal of the AND gate 66. From the foregoing, it should be apparent that so long as the decade counters 76 and associated decade switches are not satisfied as to the count, a bias will be maintained on the output transistors 80 which in turn will keep a bias on AND gate 66 that does not satisfy its output. Whenever the decade counters reach a count which satisfies the decade switches 78 so that their output voltage drops to zero and removes the bias on output transistors 80, then the bias on AND gate 66 is also removed and the appropriate voltage supplied to its input terminal. At this point, the single shot circuit 64 may also be triggered and the negative spike from differential amplifier 74 passed through the AND gate 66 to the silicon controlled rectifier circuit 68.

Decade switches 78 are of the type which permit an operator to set in an initial omission state and exposure state, and thereafter cyclic omission and exposure states until the motor 15 drives the pattern 12 against a microswitch 82 which triggers a circuit that causes the motor to reverse and return to its initial position. In this manner, the decade switches 78 could be set to keep the AND gate 66 closed for an initial large number of lines and thereafter to cyclicly open and close the gate. For example, the switches could be set to bias the AND gate 66 closed until the 999th line and then open it for the 1000th through the 1010th line during which the xenon 70 would be fired. Thereafter the switches would keep the gate closed until the 1099th line and then open it for the 1100th line through the 1110th line. Repeating this operation one line before every 100th line gives eleven light flashes followed by an omission state and then eleven light flashes up until the last line which is the 2000th line. Of course, this is only an example of the infinite variety of counts which can be introduced into the circuit.

Since the flash duration of the xenon lamp 70 is in the range of 4 to 5 microseconds, and the motor 15 drives the pattern 12 at a relatively slow rate, the X axis traversal of pattern 12 can be effected at a continuous rate without necessity for pausing at each line.

The foregoing describes the operation of the X axis traversal of the pattern 12 and the means by which it triggers the machine function which in this case is a xenon flash lamp. It is believed that the accuracy of this device is within the range of ±5 microinches.

The general function of the Y axis displacement is similar to that of the X axis in the sense that it is designed to count lines up to a certain position and then initiate a machine function. However, in this instance, the machine function is to stop the drive motor 19 after accurately positioning the pattern 12 on the selected line 13.

As indicated above, the lines 13 are foreshortened in the sense that they do not extend and intersect with the lines 14. It is found to be sufficient to use a single initial alignment line 13a which extends across the base of lines 14. The actual lines 13 to be counted are positioned adjacent the first line 14. It has been found sufficient to check the alignment at the end of each traversal when one of the lines 13 comes into the influence of the photocells E–F or G–H.

Figure 2:
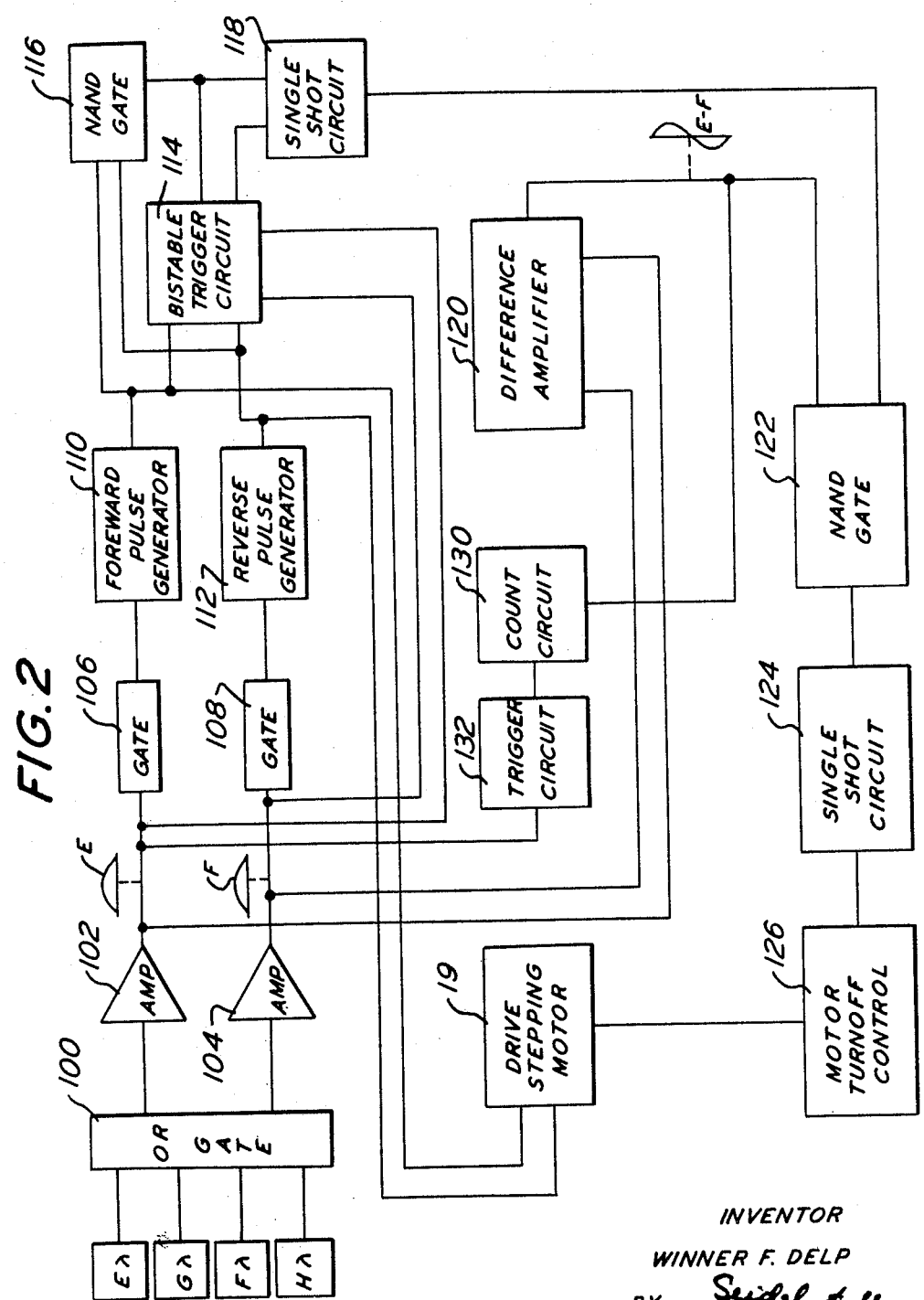
FIGURE 2 is a schematic diagram illustrating in block form a portion of electronic circuit for this invention.

The electronic circuit for the Y axis is illustrated in FIGURE 2. As with the X axis, the photocells E, G, F and H are connected to an OR gate 100 which passes their output when the voltage level on either mated pair E,F or G,H reaches a predetermined level. For purposes of illustrating the present invention, it will be assumed that the output of the OR gate 100 is represented by the paired photocells E and F. The output of the photocells E and F is amplified by the amplifiers 102 and 104 and of course it has the appearance of the wave shapes illustrated between amplifiers 102 and 104. The output of amplifiers 102 and 104 is applied to gates 106 and 108.

The output of gate 106 is connected to a forward pulse generator 110. The output of gate 108 is connected to a reverse pulse generator 112. Both forward pulse generator 110 and reverse pulse generator 112 are preferably unijunction transistor circuits which generate timed pulses that are applied to the drive motor 19 which is a stepping motor. As explained above, drive motor 19 rotates the screw 21 to reciprocate pattern 12 along the Y axis. Since drive motor 19 is of the stepping type, the number of pulses applied to it will determine the amount of rotation of screw 21 and hence the displacement of the pattern 12 along the Y axis. Pulses from the forward pulse generator 110 are connected to a terminal which causes the motor to drive in one direction, which for purposes of explanation is referred to as a forward direction. Reverse pulse generator 112 is connected to another terminal of the drive motor 19 to cause rotation in an opposite direction and hence reciprocation of the pattern 12 in what is referred to as the reverse direction. From the foregoing, it should be apparent that either forward pulse generator 110 or reverse pulse generator 112 control drive motor 19, depending upon whether the input of gate 106 or the input of gate 108 is satisfied to thereby have a voltage at its output terminal hat will trigger the correct pulse generator.

Both forward pulse generator 110 and reverse pulse generator 112 are connected to a bistable trigger circuit 114 which is in one condition if the forward pulse generator 110 applies its voltage and is in another condition if the reverse pulse generator 112 applies its voltage. The output terminals of the bistable trigger circuit 114 are fed back to the inputs of the diode gates 106 and 108 as shown. The final connection of the output or forward pulse generator 110 and reverse pulse generator 112 is into the input of a NAND gate 116 which may be of the diode type. The output of NAND gate 116 is connected back into the bistable trigger circuit 114 and to the single shot circuit 118.

In operation, the gates 106 and 108 develop an output voltage which will bias their respective pulse generators 110 and 112 to an on condition whenever the level of the amplified voltage E or F derived from amplifiers 102 and 104 is above a predetermined level. In the present case, this voltage level would be the cross over voltage shown in the upper graph of FIGURE 7 where the voltage of the two photocells are equal. Any time the voltage is above this level, either forward pulse generator 110 or the reverse pulse generator 112 is biased on by its gate. The output of the pulse generator 112 is biased on by its gate. The output of the pulse generators is applied to the drive motor 19 which steps the screw 21 until the voltage level of the energizing photocell falls below the critical level and turns the gate off. Assuming the line 13 is positioned somewhere near the center of its respective apertures, the voltage levels derived from amplifiers 102 and 104 for biasing the gates 106 and 108 will be somewhere between the peaks of the two voltages E and F. Both the forward and reverse pulse generators 110 and 112 will cease generating when both their gates are biased off, a condition which can only occur when the voltage level generated by photocells E and F are equal. See the upper graph in FIGURE 7. At this point the line 13 will be precisely aligned on the apertures 40 and 42. The condition where the voltage level is on the outside of the peak of the output of the photocell E or the photocell F and below the triggering voltage level of the gates 106 and 108 is discussed below.

As stated above, a bistable trigger circuit is connected to the output of forward pulse generator 110 and the output of reverse pulse generator 112. Moreover, it assumes one bistable condition or the other depending upon which pulse generator last generated a pulse. The NAND gate 116 is satisfied whenever both the forward pulse generator 110 and the reverse pulse generator 112 stop pulsing. This condition occurs when an image of the line 13 is precisely centered on the photocell apertures. The output of NAND gate 116 is connected to bistable trigger circuit 114 in a manner such that it freezes the circuit in the state created by the last pulse generated. For example, if the last pulse was applied by forward pulse generator 110, NAND gate 116 freezes bistable trigger circuit 114 in the state created by that last pulse. The output of NAND gate 116 also triggers a single shot circuit 118 which develops a voltage level for a predetermined amount of time. This voltage level is applied from single shot circuit 118 to the bistable trigger circuit 114. This latter votlage level serves the same function as the output of the NAND gate 116; that is, it freezes the bistable trigger circuit 114 in its last stable state. The difference between the NAND gate 116 and the single shot circuit 118 is that the single shot circuit functions only until its preset time expires. The NAND gate 116 on the other hand, functions every time both pulse generators 110 and 112 have usual outputs.

As indicated above, the output of bistable trigger circuit 114 is fed back to the input of gates 106 and 108. This output, when applied to the gates, biases them to the on condition and triggers the pulse generators. The connection between the bistable trigger circuit 114 and the gates 106 and 108 in such that if the forward pulse generator 110 is the last to pulse, the bistable trigger circuit 114 is frozen in a bistable state by the NAND gate 116 and single shot circuit 118 such that a voltage is applied to the gate 108 thereby causing the reverse pulse generator 112 to apply a reversing pulse to the drive motor 19. If the last pulse is applied by the reverse pulse generator 112, then the NAND gate 116 and single shot circuit 118 freeze the bistable trigger circuit 114 in its other state which applies a bias voltage to the gate 106 causing it to initiate the forward pulse generator 110 and step the drive motor 19 in a forward direction.

The single shot circuit 118 determines the duration and hence the amount of rotation through which the drive motor 19 steps the screw 21. The NAND gate 116 will freeze the bistable trigger circuit 114 in its last condition only when both the forward pulse generator 110 and reverse pulse generator 112 have a zero output. Obviously the feedback from the bistable trigger circuit 114 would disturb this condition. Therefore, the single shot circuit 118 overrides the NAND gate bias 116 and holds the bistable trigger circuit 114 in its last state. The single shot circuit 118 will maintain its overriding bias on bistable trigger circuit 114 until its preset time expires. After this, the bistable trigger circuit again comes under the exclusive control of the NAND gate 116.

In any mechanical system, there is a certain amount of play between the parts no matter how small the tolerances are kept. Even if the ultimate condition of the zero tolerance were reached, there would still be a certain amount of play created by wear. In a positioning device such as the present invention, this mechanical play could be a disadvantage. But to the contrary, the present invention takes advantage of the play to achieve and maintain precise positioning.

As previously indicated and as more clearly shown in copending application Ser. No. 455,857 the mechanical drive for the pattern 12 or its support is achieved by threadedly engaging a rotatable screw in a block which is pinned to the support or pattern. The mechanical play discussed above naturally occurs where the rotatable screw threadedly engages the block. When the screw is rotated in one direction or the other, the sides of its threads engage the sides of the threads of the block to apply the necessary force to push it in the desired direction. Depending upon which direction the screw is rotated, there will be more force on one side of the threads than on the other. The side of the applied force reverses itself when the screw is reversed. Moreover, a small amount of this force remains even after the screw has stopped.

Close examination of the manner in which the threads on the screw engage the threads on the block would reveal that there is actually no physical contact between them because they are separated by a thin film of lubricant which is under pressure due to the driving force of the screw. When the screw stops, a small amount of this pressure remains. If ignored, the force of the pressure would relieve itself by forcing the block and hence the pattern to displace. The amount of this displacement is measured in microinches which is quite small and can be ignored in most cases, but not in the present invention which is detecting position in the microinch range. The oil film pressure, if left unaccounted for, would force the pattern 12 off its preset Y axis position on a particular line 13 during displacement of the pattern along the X axis. Hence, the Y axis would not be true across the entire X axis displacement.

To overcome this apparent disadvantage, the amount of play between the screw threads and the block threads is measured. This measurement indicates the amount by which the screw 21 can be backed up or reversed from its previous direction without engaging the threads on their opposite side and causing a reversed displacement of the pattern 12. By backing up the screw approximately ½ of this distance, the oil film pressure can be relieved while at the same time avoiding any further displacement of the pattern 12.

The purpose of the feedback circuit described above is to provide this small amount of reversal from the previous direction of rotation of the screw 21 to thereby relieve the oil film pressure. The single shot circuit 118 controls the amount of time which the pulse generator 110 or 112 will deliver pulses to step the drive motor 19. The number of such pulses as controlled by the single shot circuit 118 is just sufficient to receive the oil film pressure. It should again be noted that the particular pulse generator which delivers the short burst of pulses to the drive motor 19 is the motor which was quiescent just as the image of line 13 arrived at its centrally located position. Of course, this central position is not disturbed since the pattern 12 is not moved at all.

Since the foregoing described circuit is a feedback circuit, it would continue to hunt unless some means were provided for turning off the drive motor 19. The following is a description of such a means.

The output amplifiers 102 and 104 are connected to a difference amplifier 120 which functions in the same manner as difference amplifier 60 to produce a signal E–F with a wave shape similar to the middle graph of FIGURE 7. The signal output of difference amplifier passes through zero when the voltage level of signals E and F is equal. As previously explained, this is an indication that a particular line 13 is precisely centered over the apertures in front of the photocells E and F. The output of difference amplifier 120 is connected to NAND gate 122. The output of single shot circuit 118 is also connected to NAND gate 122. NAND gate 122 is designed to produce an output voltage level which will trigger single shot circuit 124 only when its input from both the single shot circuit 118 and the difference amplifier 120 is zero. The single shot circuit 124 applies a voltage to the motor turn off control 126 which in turn stops the drive stepping motor 19.

To satisfy NAND gate 122, it is necessary that the output from both single shot circuit 118 and difference amplifier 120 be zero. The absence of a voltage from the single shot circuit 118 indicates that it has expired and that the screw 21 has been stepped backward or forward the requisite number of steps to relieve the oil film pressure and place it in the center of mechanical play. A zero signal from the difference amplifier 120 is indicative that the particular line 13 on the Y axis has been properly centered. Accordingly, the motor is ready to be turned off.

Even though the output of single shot circuit 118 may be zero, it is quite possible that the line 13 is not centered on the photocell apertures. In this case, the difference amplifier 120 will not have a zero output and the NAND gate 122 will not be satisfied. Accordingly, the drive motor 19 is not turned off. Reference was made above to the situation where the line 13 may be so far displaced that the output of the amplifier 102 or 104 is on the up side of the voltage E or the down side of the voltage F and below the level which would trigger the gates 106 and 108. In such a condition, the difference amplifier 120 would not have a zero reading and hence the NAND gate 122 would not function. On the other hand, gates 106 and 108 would not trigger pulse generators 110 and 112. However, the feedback from the bistable trigger circuit would bias one of the gates 106 or 108 open to cause either of the pulse generators 110 or 112 to move the line 13 until the voltage level E or F was raised sufficiently high to trigger one of the gates. This would occur since the motor 19 would not be turned off and the system would hunt.

The foregoing describes the operation of the apparatus when the machine drives the pattern 12 along the Y axis so that an image of a predetermined line 13 is adjacent photocells E and F. A count circuit 130 and trigger circuit 132 are used to bring the pattern 12 into position with the image of the predetermined line 13 on the photocells.

Count circuit 130 is the same type as the circuit illustrated in FIGURE 1 except that in this instance the input to the trigger circuit can be derived from difference amplifier 120. Of course, the single shot circuit 64 and the AND gate 66 are not required. To simplify the explanation of the drawing and avoid redundancies, the count circuit 130 has been illustrated as a single block. The output of count circuit 130 biases the trigger circuit 132 to a first state which maintains a voltage bias on gate 106 that causes the forward pulse generator 110 to continue to pulse, therefore continuously energizing the drive motor 19. Once the count is satisfied in count circuit 130, its output causes trigger circuit 132 to revert to its second state thereby relieving the voltage from gate 106. Thereafter, the output of amplifiers 102 and 104 control the operation of the circuit as explained above.

If desired, a microswitch similar to switch 82 can be supported so that the pattern 12 strikes it at the end of a traversal and causes the motor 19 to reverse and run the pattern back to the starting position.

In operation, the Y axis displacement will take place first and the pattern 12 will be positioned on a particular line 13 as determined by the preset count circuit. Once the Y axis is set, the X axis displacement is switched in. At the end of the X axis displacement, the motor 15 is reversed and runs the pattern 12 back to its starting position. At this point, the line 13 will again be positioned in the optical system 10 and a check provided for the Y axis to be certain that it has not changed.

Although the pattern 12 has been described as having a linear set of coordinate lines, those skilled in the art will readily recognize that logarithmically or exponentially arranged lines could be used. Of course, appropriate adjustments in the count circuit would have to be made.

If desired, additional circuit components can be added so as to provide tolerance bands for the electric components.

From the foregoing, it should be apparent that the described apparatus provides a highly accurate means for positioning the pattern 12 and hence any object which is movable with the pattern 12 such as a substrate coated with a sensitized material. Not only is the apparatus accurate in its initial positioning function, but it is highly accurate after repeated positioning functions over any long period of time. In fact, the pattern 12 can be removed from its support structure and replaced with practically no loss of accuracy. As stated above, the device can repeat positions with an accuracy of ±5 microinches.

The accuracy tf the machine is directly related to the coaxial method of measuring position. The only error which would occur is derived in the initial positioning of the pattern 12 with respect to the connections between the reduction printer 200 and the optical sensing system. This error is of the first order of magnitude and can be accounted for. Since the relationship between the lines 13 and 14 is fixed, each time the pattern 12 is used, the error repeats. No errors are introduced because the measurement takes place at a position remote from the optical axis. Each time the system is set at a particular Y axis line 13 and caused to traverse the X axis, it will cross the line 14 at the same point. Hence any built-in error is repeated and the image projected from the reduction printer 200 is repeated at the same point on the photo-resist.

The significance of this can be made apparent by the following example. Assume that the manufacture of a particular integrated circuit requires three precisely concentric circles to be etched in a substrtae by developing a photo-resist which has been sensitized by light projected through transparencies mounted in the image reduction printer. Assume further that the substrate is to have 200 such devices formed on it. To form the inner circle, a transparency is mounted in the image reduction printer and the counter for the X and Y axes set to trigger the xenon flash lamp at twenty equally spaced points during each X axis traversal and the Y axis is set to position along ten equally spaced lines 13. The machine is then operated and 200 latent images of the first transparency formed on the photo-resist. Thereafter, the first transparency is removed and a second transparency containing a developed image of the second concentric ring is put in its place. The machine is then operated as with the first transparency and 200 images of the second transparency which are precisely concentric with the latent images of the first transparency are formed on the photo-resist. The same steps are repeated for the third transparency. Thereafter, the substrate having the light sensitized photo-resist can be removed and developed for etching. Each latent image formed on the photo-resist will be precisely concentric with a tolerance of ±5 microinches. This can be repeated and repeated again for additional substrates without loss of accuracy.

The reduction printer 200 would include the xenon flash lamp 70 or some other form of stroboscopic flash. A typical xenon has a 5 microsecond pulse. This is so fast in comparison with the rate at which the machine is being driven across the X axis that it presents no problem in accurately triggering the flash lamp as any particular line satisfies the count. However, situations can arise where material being exposed requires a long exposure time. In those situations it will be necessary to stop at each X axis location and expose for the required interval and then continue to the next location. To achieve this result, the Y axis system can be used for both the Y and X axes. However, the Y axis system as applied to control the X axis is modified to control an electric shutter between the photosensitive material and a continuous light source. Thus, the system would stop and expose each line on the X axis which satisfies the count. This is in contradistinction to the X axis system which continuously drives and produces pulsed exposures of such short duration that there is no need to stop as its count is satisfied.

The present invention may be embodiment in other specific forms without departing from the spirit or essential attributes thereof and, accordingly, reference should be made to the appended claims, rather than to the foregoing specification as indicating the scope of the invention.

I claim:

1. Position sensing apparatus comprising a pattern of coordinate marks, optical means for imaging said marks, photoelectric devices for detecting said images, at least two sets of said photoelectric devices, the first set of photoelectric devices being positioned to detect images of marks along one coordinate axis, the second set of photoelectric devices being positioned to detect marks along a second coordinate axis, means for electrically combining the output of said first set of photoelectric devices, means responsive to said combined output signal for detecting when said signal falls through a predetermined level and generating a trigger pulse in response to said change, means for applying said trigger pulse to initiate a machine function, means for controlling the application of said trigger pulse so that only predetermined marks initiate a machine function, said second set of photoelectric devices having means to generate signals in response to the passage of a mark, means for converting said signals into a motor drive, means for terminating said motor drive when an image of said mark is precisely positioned on said second set of photoelectric devices, and means for backing said motor drive from its last direction a predetermined amount when the image of said mark is precisely positioned, and count means for controlling which particular mark is positioned on said second set of photoelectric devices.

2. Position sensing apparatus comprising a first pattern of coordinate marks, a second pattern of coordinate marks, first displacement means for displacing said first pattern of coordinate marks in a first direction, second displacement means for displacing said second pattern of coordinate marks in a second direction, first optical sensing means for sensing the displacement of said first pattern of coordinate marks in said first direction, second optical sensing means for sensing the displacement of said second pattern of coordinate marks in said second direction, first counting means for ascertaining the degree of displacement of said first pattern of coordinate marks in said first direction, second counting means for ascertaining the degree of displacement of said second pattren of coordinate marks in said second direction, means for controlling said first displacement means in response to the degree of displacement of said first pattern of coordinate marks in said first direction, means for controlling said second displacement means in response to the degree of displacement of said second pattern of coordinate marks in said second direction, each of said first and second optical sensing means including first and second photoelectric devices, said first and second photoelectric devices being spaced from each other, optical focusing means for focusing an image of one of said coordinate marks on each of said first and second spaced photoelectric devices, said first photoelectric device having a first output, said second photoelectric device having a second output, means for electrically combining said first and second outputs, the combination of said first and said second outputs being indicative of the alignment of said image with respect to said spaced first and second photoelectric devices, said first optical sensing means further including backing means for displacing said first pattern of coordinate marks a predetermined amount in a direction opposite to the direction of the last displacement of said first pattern of coordinate marks, means to initiate the operation of said backing means when said first pattern of coordinate marks is precisely positioned.

3. A position sensing apparatus in accordance with claim 2 wherein said first pattern of coordinate marks is perpendicular to said second pattern of coordinate marks.

4. Position sensing apparatus comprising a first pattern of coordinate marks, a second pattern of coordinate marks, first displacement means for displacing said first pattern of coordinate marks in a first direction, second displacement means for displacing said second pattern of coordinate marks in a second direction, first optical sensing means for sensing the displacement of said first pattern of coordinate marks in said first direction, second optical sensing means for sensing the displacemet of said second pattern of coordinate marks in said second direction, first counting means for ascertaining the degree of displacement of said first pattern of coordinate marks in said first direction, second counting means for ascertaining the degree of displacement of said second pattern of coordinate marks in said second direction, means for controlling said first displacement means in response to the degree of displacement of said first pattern of coordinate marks in said first direction, means for controlling said second displacement means in response to the degree of displacement of said second pattern of coordinate marks in said second direction, each of said first and second optical sensing means including first and second photoelectric devices, said first and second photoelectric devices being spaced from each other, optical focusing means for simultaneously focusing an image of one of said coordinate marks on each of said first and second spaced photoelectric devices, said first photoelectric device having a first output, said second photoelectric device having a second output, means for electrically combining said first and second outputs, the combination of said first and said second outputs being indicative of the alignment of said image with respect to said spaced first and second photoelectric devices, means for halting the displacement of said first pattern of coordinate marks in said first direction when the outputs of said first and second photoelectric devices of said first optical sensing means are equal to each other, and means for halting the displacement of said second pattern of coordinate marks in said second direction when the outputs of said first and second photoelectric devices of said second optical sensing means are equal to each other.

References Cited

UNITED STATES PATENTS

| | | | |
|---|---|---|---|
| 2,941,087 | 6/1960 | Blumberg et al. | 250—219 |
| 3,038,369 | 6/1962 | Davis | 250—232 X |
| 3,096,441 | 7/1963 | Burkhardt | 250—231 X |
| 3,207,904 | 9/1965 | Heinz | 250—202 X |
| 3,330,964 | 7/1967 | Hobrough et al. | 250—237 |

WALTER STOLWEIN, Primary Examiner

U.S. Cl. X.R.

250—237